(12) United States Patent
Usui

(10) Patent No.: US 6,760,203 B2
(45) Date of Patent: Jul. 6, 2004

(54) SWITCHING POWER SUPPLY WITH OVERCURRENT PROTECTION

(75) Inventor: Hiroshi Usui, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 54 days.

(21) Appl. No.: 10/185,806

(22) Filed: Jun. 27, 2002

(65) Prior Publication Data

US 2003/0002233 A1 Jan. 2, 2003

(30) Foreign Application Priority Data

Jun. 28, 2001 (JP) .................................... P2001-196895

(51) Int. Cl.$^7$ ................................................ H02H 9/00
(52) U.S. Cl. .................................... 361/18; 307/64
(58) Field of Search ........................ 361/18; 363/23, 363/25; 307/64

(56) References Cited

U.S. PATENT DOCUMENTS

| | | | | |
|---|---|---|---|---|
| 4,293,902 A | * | 10/1981 | White | 363/26 |
| 4,314,327 A | * | 2/1982 | DePuy | 363/142 |
| 4,383,293 A | * | 5/1983 | Randall | 363/25 |
| 4,514,764 A | * | 4/1985 | Borg et al. | 358/181 |
| 4,533,863 A | * | 8/1985 | Luhn et al. | 322/28 |
| 4,985,818 A | * | 1/1991 | Niederreiter | 363/19 |
| 5,914,566 A | * | 6/1999 | Matsumoto et al. | 315/82 |
| 5,949,154 A | * | 9/1999 | Williams | 307/64 |

FOREIGN PATENT DOCUMENTS

JP  409037547  * 2/1997  ............ H02M/3/28

* cited by examiner

*Primary Examiner*—Gregory J. Toatley, Jr.
*Assistant Examiner*—Zeev Kitov
(74) *Attorney, Agent, or Firm*—Bachman & LaPointe, P.C.

(57) ABSTRACT

A switching power supply with overcurrent protection is provided that comprises a current detection resistor (8) for detecting electric current through an FET (5); a capacitor (11) for accumulating electric charge in response to overcurrent through the current detection resistor (8) due to late OFF switching of the FET (5); and a transistor (12) for reducing source voltage applied to a feed terminal of a control circuit (7) below an operation voltage. When accumulated electric charge in the capacitor (11) exceeds a predetermined level, the transistor (12) is operated to reduce source voltage for the control circuit (7) below operative voltage to stop operation of the control circuit (7) and to thereby restrain overcurrent during delayed time until OFF switching of the FET (5).

5 Claims, 6 Drawing Sheets

SWITCHING POWER SUPPLY WITH OVERCURRENT PROTECTION

FIELD OF THE INVENTION

The present invention relates to a power supply, in particular a switching power supply for protecting electric elements from overcurrent caused by late switching operation of a switching element involved in the power supply.

PRIOR ART

A prior art DC-DC converter is one of switching power supplies that comprise a transformer having primary and secondary windings; a switching transistor connected in series to the primary winding of the transformer and a DC power source; a current detection resistor connected in series to the switching element for detecting electric current through the switching element; an output smoothing circuit connected to the secondary winding of the transformer; and a control circuit for producing drive signals of controlled pulse duration to a control terminal of the switching transistor. A feed terminal of the control circuit is connected to the DC power source through a starting resistor and to one end of a drive winding of the transformer through a diode. The control circuit has a pulse generator or oscillator for generating periodic pulses that are supplied to various circuits in the control circuit.

If the switching transistor is operated with increased or higher switching frequency, a considerable time delay occurs between periodic pulses from the oscillator and OFF switching of the switching transistor so that the switching transistor cannot timely be turned ON and OFF in exact synchronization with output pulses from the oscillator. With higher switching frequency of the switching transistor, OFF switching timing of the switching transistor is more delayed for output pulses from the oscillator so that a primary current flows through the switching transistor during the delayed period of time until OFF switching of the switching transistor to thereby cause overcurrent to flow through the secondary winding, and remarkable surge voltages occur on the secondary winding and drive winding of the transformer while the control circuit cannot be turned OFF due to increased voltage produced on the drive winding. In this way, remarkably increased peak current flows through the primary winding, and it may cause damage to the switching transistor and breakdown of other electric elements, however, the switching transistor cannot have its performance capable of switching with shorter ON width.

An object of the present invention is to provide a switching power supply with overcurrent protection capable of effectively controlling excess current resulted from late OFF switching of a switching element to prevent breakdown of electric elements.

SUMMARY OF THE INVENTION

The switching power supply according to the present invention comprises a transformer (2) having primary and secondary windings (3, 4); a main switching element (5) connected in series to a DC power source (1) and the primary winding (3) of the transformer (2); an output smoothing circuit (6) connected to the secondary winding (4) of the transformer (2); and a control circuit (7) for producing drive signals to a control terminal of the main switching element (5) to turn the main switching element (6) ON and OFF and take out DC output from the output smoothing circuit (6); current detection means (8) for detecting electric current through the main switching element (5); storing means (100) for accumulating outputs from the current detection means (8); and voltage control means (200) for reducing source voltage applied to a feed terminal of the control circuit (7) below an operation voltage when output form the storing means (100) is over a predetermined value. The current detection means (8) detects the current through the main switching element (5) and produces detected outputs that are accumulated in the storing means (100). When excess current occurs due to late ON to OFF switching of the main switching element (5), the storing means (100) accumulates the excess current. When the accumulated voltage in the storing means (100) exceeds a predetermined level, the voltage control means (200) is operated to reduce the source voltage for the control circuit (7) below the operative voltage or to the OFF level to stop operation of the control circuit (7) and to thereby restrain excess current during delayed time until OFF switching of the main switching element (5). Deactivation of the control circuit (7) protects the main switching element (5) and output smoothing circuit (6) against excess current, and reducing electric stress thereon to prevent breakdown of these elements.

BRIEF DESCRIPTION OF THE DRAWINGS

These as well as other object of the present invention will become apparent during the course of the following description with reference to the accompanying drawings, in which.

DETAILED DESCRIPTION OF THE INVENTION

Figure 1:
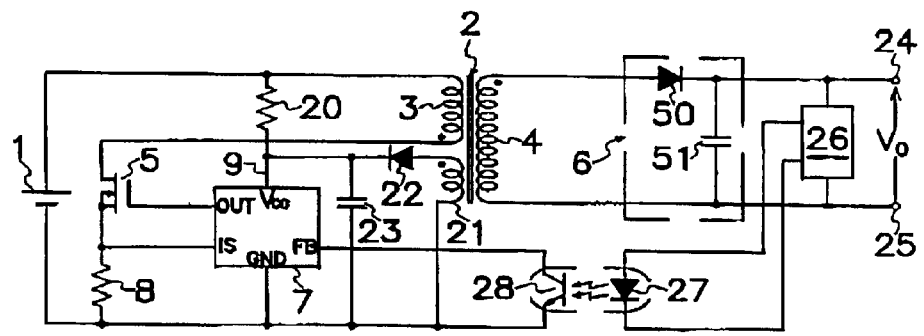
FIG. 1 is a circuit diagram of a prior art DC-DC converter.

Referring now to the accompanying drawings, FIG. 1 shows a circuit diagram of a prior art DC-DC converter that comprises a transformer 2 having primary and secondary windings 3, 4; an field effect transistor (FET) 5 as a main switching element connected in series to primary winding 3 of transformer 2 and a DC power source 1; a current detection resistor 8 connected in series to FET 5 for detecting electric current through FET 5; an output smoothing circuit 6 connected to secondary winding 4 of transformer 2; and a control circuit 7 for producing drive signals of controlled pulse duration to a control terminal or gate of FET 5. Control circuit 7 has a feed terminal 9 connected to DC power source 1 through a starting resistor 20 and to one end of a drive winding 21 of transformer 2 through a diode 22. Drive winding 21 is connected in parallel to diode 22 and capacitor 23, and the other end of drive winding 21 is connected to DC power source 1. Secondary winding 4 of transformer 2 is connected through output smoothing circuit 6 to output terminals 24, 25. Output smoothing circuit 6 contains a rectifier diode 50 connected to one end of secondary winding 4; and a smoothing capacitor 51 connected in parallel to secondary winding 4. Connected to output terminals 24, 25 is a voltage detecting circuit 26 that includes an error detecting circuit not shown to produce differential output voltage of output voltage across output terminals 24, 25 from a reference voltage provided in voltage detecting circuit 26 so that the differential voltage is applied on a light emitting diode (LED) 27 to turn it ON. Accordingly, LED 27 emits light more brightly with increase of the differential voltage of the output voltage. A light receiving transistor 28 receives light from LED 27 supplied to a feedback terminal FB of control circuit 7 that produces output voltage of modulated pulse width to FET 5 to maintain substantially constant output voltage $V_o$ from output terminals 24, 25.

Figure 2:
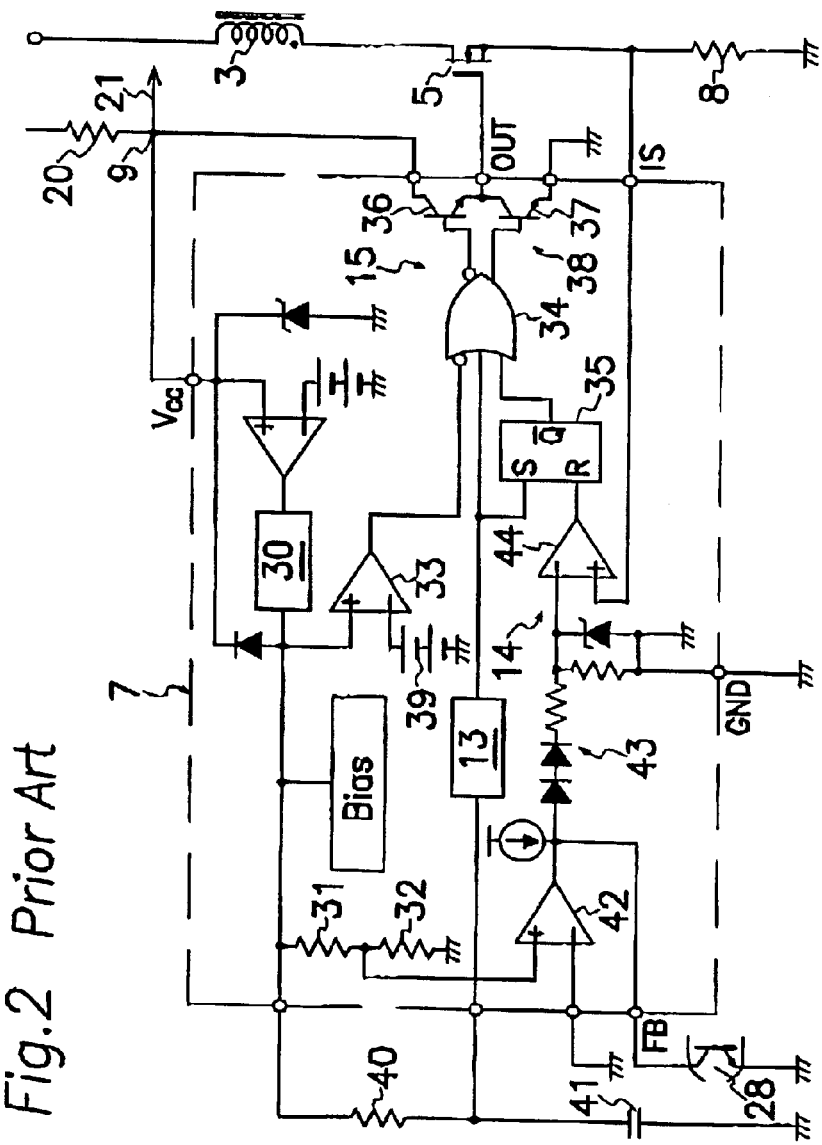
FIG. 2 is a circuit diagram of a control circuit used in the DC-DC converter shown in FIG. 1.

As shown in FIG. 2, control circuit 7 includes an input voltage regulator 30 and a drive circuit 15 connected to input voltage regulator 30. Electric power is supplied to a feed terminal 9 of control circuit 7 from drive winding 21 and also from DC power source 1 through starting or trigger resistor 20, and regulator 30 regulates voltage. Output from input voltage regulator 30 is applied on voltage dividing resistors 31, 32 and a comparator 33. A drive circuit 15 includes R-S flip flop 35, a gate circuit 34 for receiving output from R-S flip flop 35 and a drive circuit 38 for producing drive pulses to FET 5 to turn it ON and OFF in response to outputs of gate circuit 34. Drive circuit 38 comprises an activating transistor 86 for turning FET 5 ON, and a deactivating transistor 37 for turning FET 5 OFF. Collector of activating transistor 36 is connected to feed terminal 9, and emitter of activating transistor 36 is connected to gate of FET 5 and collector of deactivating transistor 37. Each base of activating and deactivating transistors 36, 37 is connected to related output terminals of gate circuit 34, and emitter of deactivating transistor 37 is grounded. External resistor 40 and external capacitor 41 are connected to oscillator 13 to adjust frequency of pulses generated from oscillator 13. For example, a preferable control circuit 7 includes UC3842 made by Unitorode Corporation, Merimack, N.H. for controlling pulse width modulation (PWM) of output pulses to FET 5. Error amplifier 42 has a non-inverting input terminal connected between voltage dividing resistors 31, 32, and an inverting input terminal connected to earth. Light receiving transistor 28 is connected to an output terminal of error amplifier 42 through feedback terminal FB of control circuit 7. Control circuit 7 comprises a regulator 43; and an excess current comparator 14 for comparing the output from current detection means 8 with output from regulator 43 to produce outputs that turn FET 5 OFF when output from current detection means 8 is higher than that of regulator 43.

Output terminal of error amplifier 42 is also connected through regulator 43 to an inverted input terminal of a reset comparator 44 that has a non-inverting input terminal connected between FET 5 and current detection resistor 8. Regulator 43 produces a reference voltage, and reset comparator 44 forms an excess current comparator 14 that produces outputs to R-S flip flop 35 to reset it from output terminal of reset comparator 44, when electric current through current detection resistor 8 is over a current value corresponding to reference voltage determined by regulator 43.

In operation, electric current flows from DC power source 1 through starting or trigger resistor 20 to capacitor 23, and capacitor 23 is charged to an operation voltage $V_{thon}$ of control circuit 7 so that oscillator 13 produces periodical pulse signals to gate circuit 34 and R-S flip flop 35. When pulse signals from oscillator 13 are on low level, activating transistor 36 is turned ON while deactivating transistor 37 is turned OFF. Accordingly, FET 5 is switched ON to produce electric current from DC power source 1 through primary winding 3, FET 5 and resistor 8 to accumulate electric energy in transformer 2. Adversely, when pulse signals from oscillator 13 are on high level, R-S flip flop 35 is set to turn activating transistor 36 OFF while deactivating transistor 37 is turned ON. Accordingly, FET 5 is switched OFF to cease current flow through FET 5, while electric energy accumulated in transformer 2 is discharged from secondary winding 4 through output smoothing circuit 6 to output terminals 24, 25. In this way, activating and deactivating transistors 36, 37 are alternately turned ON and OFF to periodically switch FET 5 ON and OFF in order to take out constant DC output from output terminals 24, 25 through output smoothing circuit 6. A part of electric energy accumulated in transformer 2 is discharged from drive winding 21 and supplied to feed terminal 9 of control circuit 7 through diode 22 and capacitor 23 to drive control circuit 7. Voltage detecting circuit 26 detects excess level of the output voltage over the reference voltage to turn LED 27 ON by excess outputs so that light receiving transistor 28 is operated to reduce outputs from error amplifier 42 and to thereby lower reference voltage determined by regulator 43. Lowered reference voltage from regulator 43 is applied to inverted input terminal of reset comparator 44.

When voltage level applied on current detection resistor 8 is higher than reference voltage from regulator 43, reset comparator 44 produces output to R-S flip flop 85 to turn it from set to reset condition. Accordingly, R-S flip flop 35 produces, from Q bar output terminal, output of high level to gate circuit 34 which therefore turns activating transistor 36 OFF and deactivating transistor 37 ON, turning FET 5 OFF. R-S flip flop 35 is retained in reset condition until it receives a subsequent drive pulse from oscillator 13 at set terminal of R-S flip flop 35 to maintain deactivating transistor 37 in ON condition and thereby keep FET 5 in OFF condition. In this way, control circuit 7 can produce to gate of FET 5 signals of pulse width modulation (PWM) to generate output voltage of substantially constant level from output terminals 24, 25. When output voltage of input voltage regulator 30 is lowered below reference voltage 39, comparator 33 produces all output to an inverted terminal of gate circuit 34 to turn activating transistor 36 OFF and cease operation of FET 5.

Figure 3:
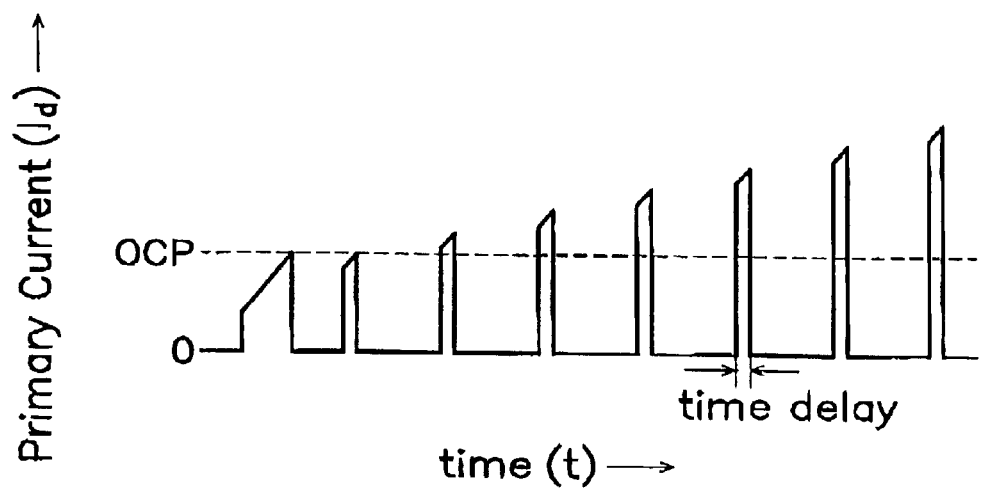
FIG. 3 is a time chart of electric current produced due to late OFF switching of a main switching element.

In prior art DC-DC converter shown in FIG. 1, FET 5 performs ON and OFF operation so that primary current through FET 5 does not exceed a constant level (OCP/Overcurrent Protection level) as shown in FIG. 3 during overloaded condition across output terminals 24, 25. In this case, if input voltage of DC power source 1 is constant, the converter produces a constant power output as shown by a curved line A–B of FIG. 4 from output terminals 24, 25. In this situation, output current $I_o$ increases when output voltage $V_o$ is lowered due to decrease of load impedance. Accordingly, if output current $I_o$ further increases due to further drop of output voltage $V_o$, there would be a likelihood that rectifier diode 50 of output smoothing circuit 6 breaks down because of increased electric stress on rectifier diode 50 connected to output terminals 24, 25.

In a typical protective manner, comparator 33 detects lowered output voltage $V_o$ below reference voltage 39 to produce an output to stop operation of control circuit 7 since output voltage form drive winding 21 is proportional to output voltage $V_o$ from output terminals 24, 25.

Figure 4:
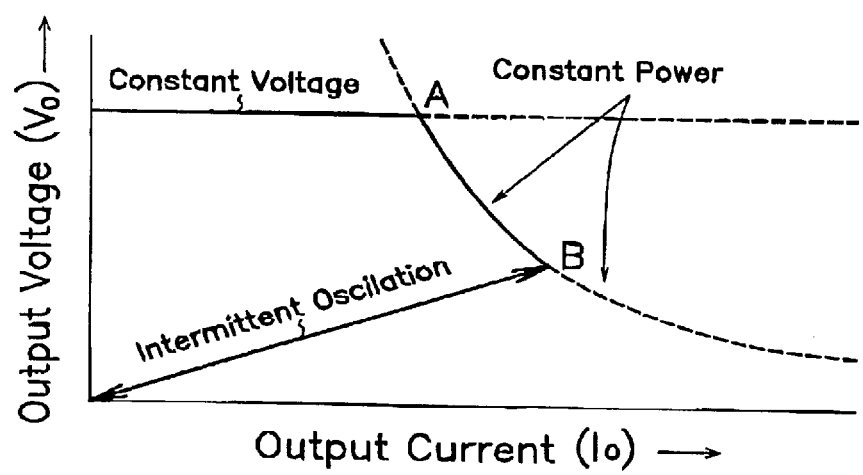
FIG. 4 is a graph showing output voltage variation of the prior art DC-DC converter with output current variation.
Figure 5:
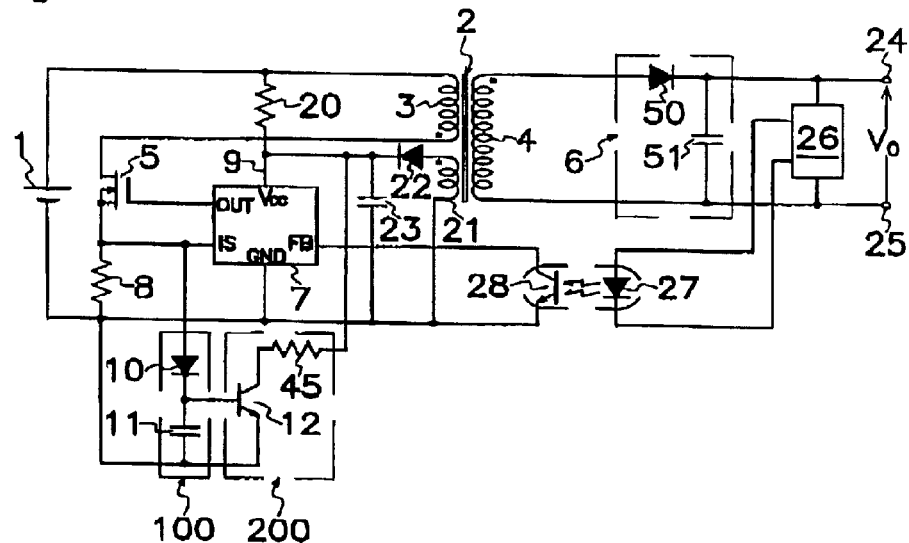
FIG. 5 is a circuit diagram of the switching power supply according to the present invention applied to a DC-DC converter.
Figure 6:
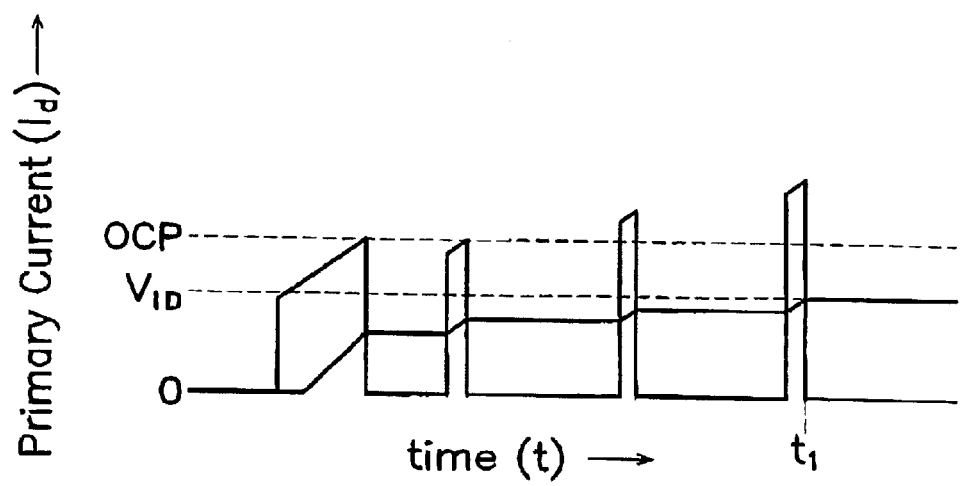
FIG. 6 is a time chart of electric current produced by late OFF switching of the main switching element.
Figure 7:
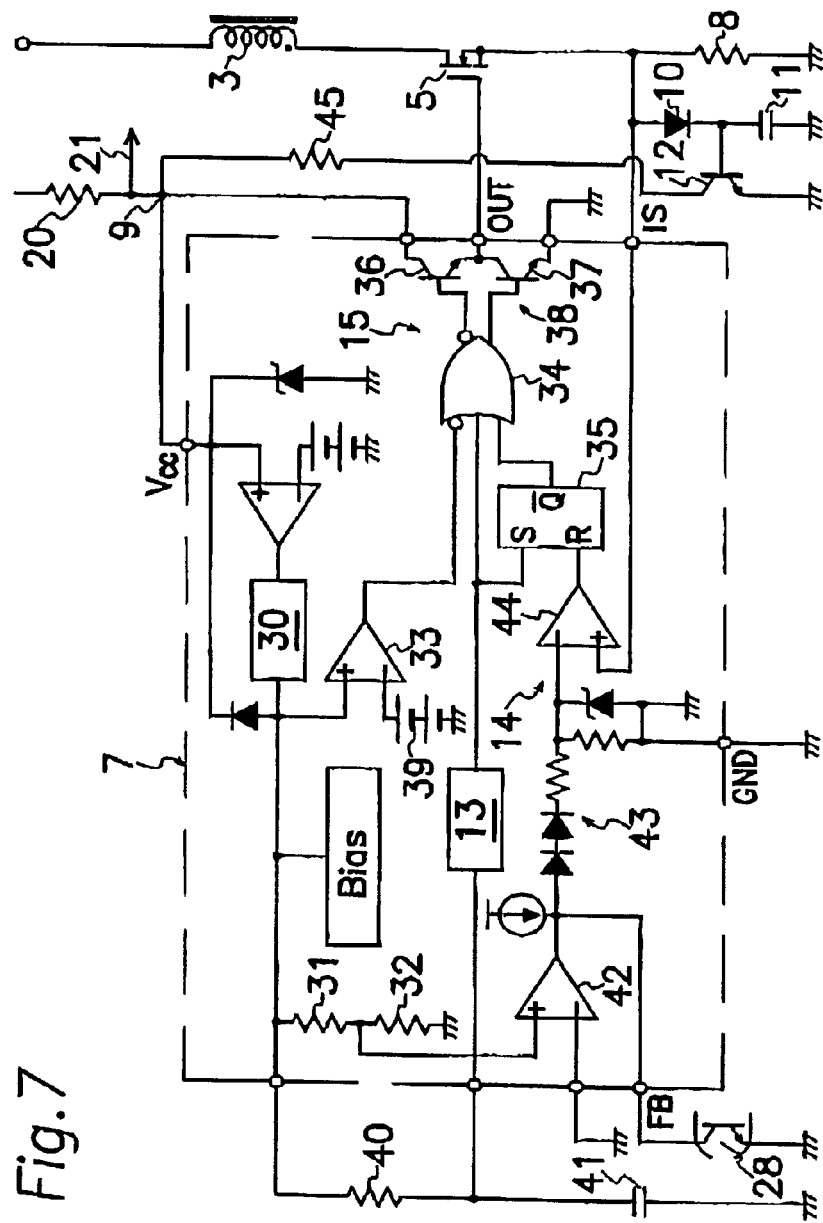
FIG. 7 is a circuit diagram of a control circuit used in the DC-DC converter shown in FIG. 5.

Specifically, when output voltage $V_o$ is lowered from A point shown in FIG. 4, excess current comparator 14 starts to operate and generate output which turns R-S flip flop 35 RESET and FET 5 OFF. When output voltage $V_o$ reaches B point of FIG. 4, source voltage of control circuit 7 is lowered to OFF voltage $V_{thoff}$. Subsequently, capacitor 23 is charged by electric current through trigger resistor 20, and control circuit 7 again starts to operate when capacitor 23 is charged to ON level. However, operation of excess current comparator 14 turns FET 5 OFF, and therefore, control circuit 7 repeats intermittent ON and OFF operation to reduce continuous electric stress on rectifier diode 50 and prevent breakdown of related elements. In this respect, it should be noted that intermittent ON and OFF operation of control circuit 7 can be performed between B and zero points shown in FIG. 4 in a lower switching frequency range of FET 5.

However, if switching frequency of FET 5 increases to higher level, a considerable time delay occurs between starting of reset comparator 44 and OFF switching of FET 5 that therefore cannot timely be turned ON and OFF based on outputs from oscillator 13. In such higher switching frequency that results in significant time delay between starting of reset comparator 44 and OFF switching of FET 5, primary current flows through FET 5 to form ON pulses of minimum time width over OCP level shown in FIG. 3, however, FET 5 cannot have performance capable of switching operation with shorter ON width. Also, as shown in FIG. 3, with increase of primary current $I_d$ through primary winding 3, remarkable surge voltages occur on secondary winding 4 and drive winding 21 of transformer 2, and control circuit 7 cannot be turned OFF due to increased rectified voltage produced on drive winding 21. In this way, remarkably increased peak current through primary winding 3 may cause damage to FET 5 and breakdown of rectifier diode 50.

FIGS. 5 to 11 illustrate preferred embodiments of DC-DC converter according to the present invention wherein same reference symbols are used in FIGS. 5 to 11 to indicate substantially similar components as those shown in FIGS. 1 to 4 and avoid the repeated description. In a switching power supply according to the preferred embodiment of the present invention applied to a DC-DC converter shown in FIGS. 5 and 6, connected in parallel to current detecting resistor 8 is storing means 100 that comprises a rectifier diode 10 as a rectifier element for rectifying outputs from current detection means 8; and a capacitor 11 connected in series to diode 10 for accumulating outputs from capacitor 11. Voltage control means 200 comprises a transistor 12 as a control switching element having two main terminals and a control terminal, and one of the main terminals is a collector connected through a resistor 45 to feed terminal 9 of control circuit 7, the other of the main terminals is an emitter connected to a negative terminal of DC power source 1, and control terminal is a base connected between diode 10 and capacitor 11. Control circuit 7 is deactivated when source voltage of feed terminal 9 is reduced to OFF level $V_{thoff}$ due to operation of voltage control means 200. Capacitor 11 is discharged when voltage control means 200 reduces source voltage of control circuit 7 below operative voltage or to OFF level. Voltage control means 200 produces outputs that turn FET 5 OFF through comparator 33. When capacitor 11 is charged to a level over a threshold value $V_{ID}$ set for base of transistor 12, it is turned ON to reduce source voltage for control circuit 7 below operative voltage, and therefore, control circuit 7 stops operation to control excess current during delayed time until OFF switching of FET 5.

When switching frequency of FET 5 rises to some extent, overcurrent flows through FET 5 and current detecting resistor 8 during delayed time between output from comparator 44 and OFF switching of FET 5, and capacitor 11 can accumulate overcurrent flowing through FET 5 and rectifier diode 10. When electric charge accumulated in capacitor 11 exceeds control threshold $V_{ID}$ set for base of transistor 12, it is turned ON at point $t_1$ of FIG. 6, reducing source voltage on feed terminal 9 below operation voltage to stop operation of control circuit 7. Then, current flows through base-emitter of transistor 12 to discharge charged level of capacitor 11 below control threshold $V_{ID}$, turning transistor 12 OFF. Subsequently, capacitor 23 is charged through starting resistor 20 to re-start operation of control circuit 7.

Figure 8:
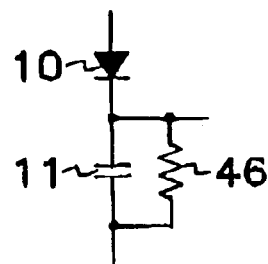
FIG. 8 is a partial circuit diagram of a second embodiment according to the present invention.
Figure 9:
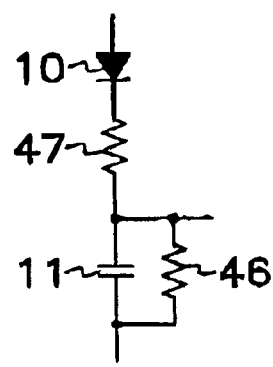
FIG. 9 is a partial circuit diagram of a third embodiment according to the present invention.
Figure 10:
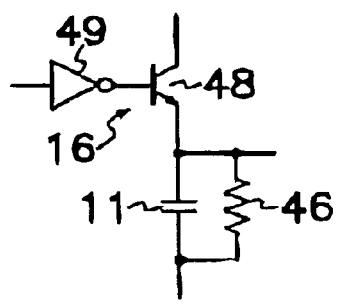
FIG. 10 is a partial circuit diagram of a fourth embodiment according to the present invention.
Figure 11:
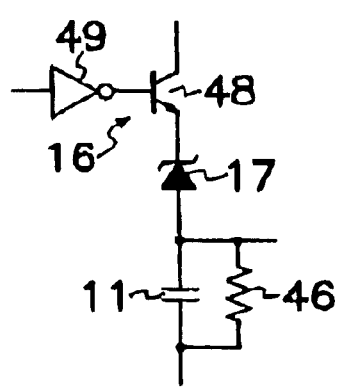
FIG. 11 is a partial circuit diagram of a fifth embodiment according to the present invention.

The present invention is not limited to the foregoing embodiments, and may contain more various variations in the embodiments. For example, as shown in FIG. 8, a resistor 46 may be connected in parallel to capacitor 11 for discharge. Also, as shown in FIG. 9, a resistor 47 may be connected between capacitor 11 and rectifier diode 10. In this case, only peak current of overcurrent may be accumulated in capacitor 11 through a voltage regulating element such as a Zener diode or avalanche diode is connected between capacitor 11 and rectifier diode 10 in lieu of resistor 47. As shown in FIG. 10, in place of diode 10, a switching element 16 for gate may be provided comprising a transistor 48 with the base connected to output terminal of oscillator 13 through inverter 49 In this case, capacitor 11 can accumulate overcurrent since transistor 48 is turned ON during OFF period of oscillator 13 that produces low level outputs. Also, as shown in FIG. 11, a Zener diode 17 as a voltage regulating element is connected between transistor 48 and capacitor 11 to accumulate only peak current of overcurrent in capacitor 11.

With the switching power supply according to the present invention, can effectively control overcurrent resulted during late off switching of the main switching element operated with high frequency to protect the main switching element and rectification smoothing circuit from overcurrent, reducing electrical stress, preventing breakdown of electric elements for safe drive of the power supply.

What is claimed are:

1. A switching power supply comprising a transformer having primary and secondary windings;
   a main switching element connected in series to a DC power source and said primary winding of said transformer;
   an output smoothing circuit connected to said secondary winding of said transformer;
   a control circuit for producing drive signals to a control terminal of said main switching element to turn said main switching element ON and OFF and take out DC output from said output smoothing circuit;
   current detection means for detecting electric current through said main switching element;
   storing means for accumulating excess current received from said current detection means due to late OFF switching of said main switching element; and
   voltage control means for reducing source voltage applied to a power terminal of said control circuit below an operation voltage when output from said storing means is over control threshold;
   said voltage control means comprising a control switching element that has at least two main terminals and a control terminal, one of said main terminals of said control switching element being connected to a feed terminal of said control circuit, the other of said main terminals of said control switching element being connected to a negative terminal of said DC power source, and said control terminal of said control switching element being connected to the capacitor of said storing means;

wherein said control switching element is turned ON for reducing the source voltage on said feed terminal below operation voltage to stop operation of said control circuit when electric charge accumulated in said capacitor exceeds said control threshold set for the control terminal of said control switching element, and then, when electric charge accumulated in said capacitor is discharged below said control threshold, said control switching element is turned OFF to re-start operation of said control circuit.

2. The switching power supply as defined in claim 1, wherein said storing means comprises a rectifying element for rectifying outputs from said current detection means to said capacitor.

3. The switching power supply as defined in claim 2, wherein said storing means comprises a resistor connected in parallel to said capacitor.

4. The switching power supply as defined in claim 3, wherein said storing means comprises a resistor connected in series between said capacitor and said rectifying element.

5. The switching power supply as defined in claim 1, wherein said transformer has a drive winding connected to said feed terminal of said control circuit.

* * * * *